United States Patent [19]

Hess et al.

[11] 4,026,607

[45] May 31, 1977

[54] BRAKE PRESSURE CONTROL VALVES FOR SPLIT BRAKING SYSTEMS

[75] Inventors: Wolfgang Hess, Koblenz; Reiner Viebahn, Neuwied, both of Germany

[73] Assignee: Girling Limited, Birmingham, England

[22] Filed: Feb. 19, 1975

[21] Appl. No.: 551,009

[30] Foreign Application Priority Data

Feb. 20, 1974 United Kingdom ............... 7796/74

[52] U.S. Cl. .............................. 303/6 C; 188/349; 303/22 R
[51] Int. Cl.² ...................... B60T 8/18; B60T 8/26
[58] Field of Search ........... 303/6, 84, 22; 188/349, 188/151 A, 345, 752, 195; 137/87

[56] References Cited

UNITED STATES PATENTS

| 3,441,318 | 4/1969 | Bueler | 303/6 C |
| 3,459,000 | 8/1969 | Oberthür | 303/6 R |
| 3,684,329 | 8/1972 | Kawabe et al. | 303/6X |
| 3,736,031 | 5/1973 | Yabuta et al. | 303/6 C |
| 3,738,709 | 6/1973 | Stokes | 303/6 C |
| 3,806,207 | 4/1974 | Reinecke et al. | 303/6 C X |

*Primary Examiner*—Trygve M. Blix
*Assistant Examiner*—Douglas C. Butler
*Attorney, Agent, or Firm*—Scrivener Parker Scrivener & Clarke

[57] ABSTRACT

A valve assembly for use in a vehicle braking system comprises two valves having respective inlets for connection to separate wheel brakes. Each valve has a plunger carrying one part of a valve set which co-operates with a stationary part of the valve set to control communication between the inlet and outlet, and a spring urging the plunger in a direction to maintain the valve set open. Each plunger has opposed piston portions of different dimensions subjected to the pressure at the inlet of the associated valve to produce a net force tending to close the valve, and a further portion subjected to the inlet pressure of the other valve to produce an additional force which is removed upon failure of that inlet pressure of the other valve.

5 Claims, 2 Drawing Figures

BRAKE PRESSURE CONTROL VALVES FOR SPLIT BRAKING SYSTEMS

This invention relates to pressure control valve assemblies for use in vehicle braking systems.

Modern vehicle braking systems are often of the type comprising two separate pressure sources supplying pressure to different wheel cylinder pressure spaces. In a simple form, known as the vertically split system, the wheel cylinders on the front wheel brakes are connected to one pressure source and those on the rear brakes to the other, but the invention is not concerned with these simple systems, but with those in which one pressure source is connected to wheel brake cylinders at both the front and the rear wheel brakes. Such systems include those commonly known as horizontally split, diagonally split, and L-split systems.

A further known refinement of such systems is the provision of brake pressure control valves for reducing (relative to the front brakes) or limting the pressure transmitted to the rear brakes, in order to reduce the tendency of the rear wheels to lock and skid under high braking pressures. In order to cater for the situation in which one pressure source fails, it has been proposed to provide means responsive to pressure failure in that part of the system to disable or by-pass the control valve in the other part of the system, to prevent that valve from reducing the total braking effort available in the operative part of the system.

However, it is in many cases undesirable for the control valve in question to be rendered ineffective in this manner because of the resulting unbalance in braking effort as between the brakes on opposite sides of the vehicle, and the present invention resides the provision of valve assemblies designed to modify the operating characteristics of the respective control valves in the event of pressure failure of one pressure source.

In accordance with one feature of the invention, there is provided a valve assembly for use in a vehicle braking system, comprising first and second control valves having respective inlets for connection to separate pressure sources and respective outlets for connection to separate wheel brakes, wherein the first valve has a connection with, and in operation is subjected to the pressure of, the inlet of the second valve, the characteristics of the first valve being modified in response to failure of the inlet pressure of the second valve.

The first valve preferably has a pressure responsive member which is subject in use to a number of opposing forces, the net effect of which is to close or open the valve, one of these forces resulting from the member being subjected to the pressure in the inlet of the second valve, so that when that pressure and corresponding force is absent, the cut-off pressure at which the first valve starts to operate is raised or lowered.

In accordance with another feature of the invention, there is provided a valve assembly for use in a vehicle braking system, comprising first and second valves having respective inlets for connection to separate pressure sources and respective outlets for connection to separate wheel brakes, wherein each valve has a pressure responsive member carrying one part of a valve set which co-operates with a stationary part of the valve set to control communication between the inlet and outlet and biasing means urging the member in a direction to maintain the valve set open, and wherein the pressure responsive member has opposed piston portions of different dimensions, both being subjected to the pressure at the inlet of the associated valve to produce a net effect tending to close the valve set in opposition to said biasing means, and a further portion being subjected to the inlet pressure of the other valve to produce an additional force on the pressure responsive member, said additional force being removed upon failure of the inlet pressure of the other valve.

Two particular valve assemblies in accordance with the invention will now be described, with reference to the accompanying drawings wherein.

The valve assemblies are generally similar in construction and operation, and so corresponding parts of the two assemblies are identified in the respective FIGURES by the same reference numerals.

In both cases, the assembly comprises a pair of pressure control valves in the form of pressure limiting valves, having their own respective inlets and outlets.

Figure 1:
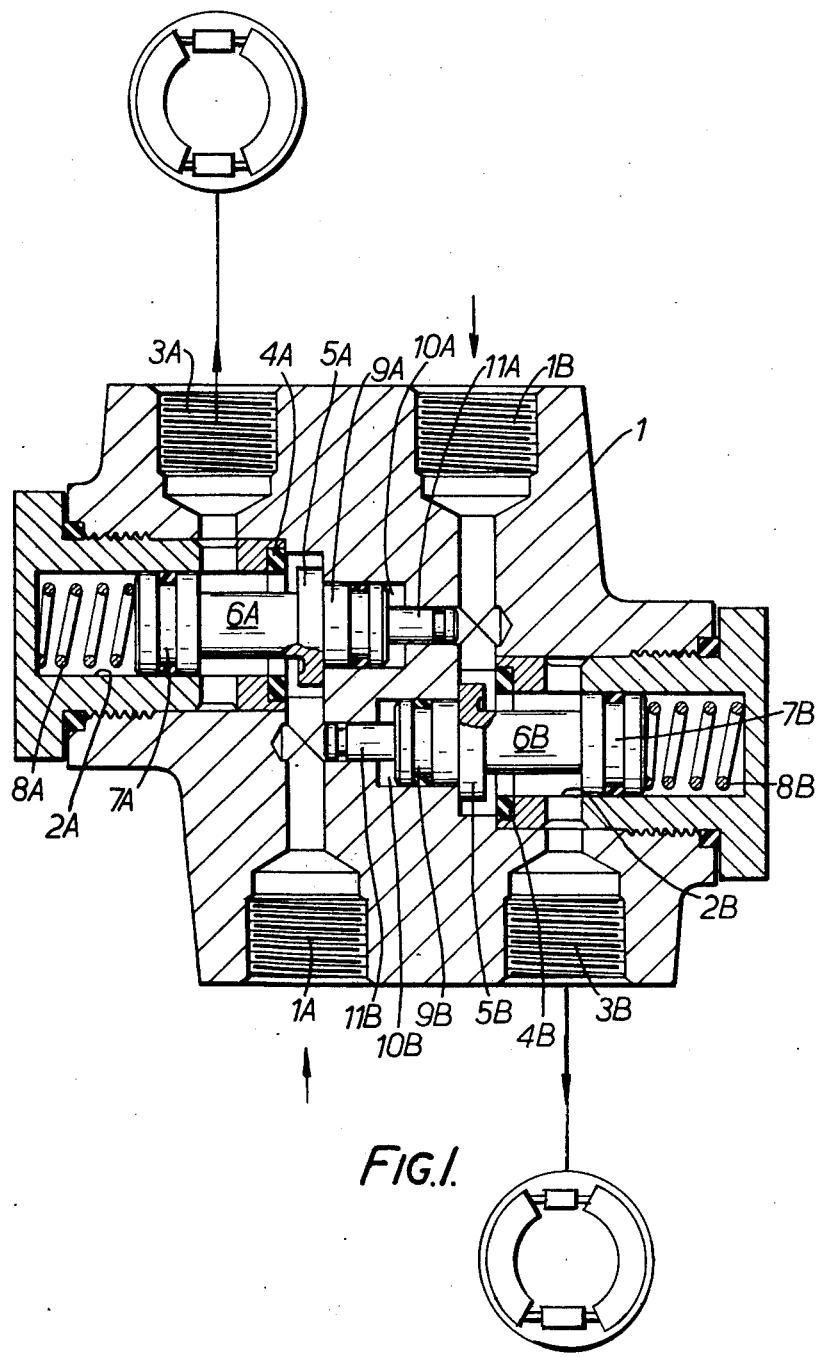
FIG. 1 is an axial cross-section of one embodiment of the invention.

The valve assembly shown in FIG. 1 comprises a housing 1 having separate inlets 1A and 1B communicating with respective stepped valve bores 2A, 2B having at their wider ends respective outlets 3A, 3B. Between the inlet and outlet of each valve bore is a stationary valve seat 4A, 4B for co-operation with a closure member formed as a face valve head 5A, 5B forming an integral part of a valve plunger 6A, 6B having at its outer end, beyond the outlet, a piston head 7A, 7B working in a piston bore against control spring 8A, 8B. A second piston head 9A, 9B is positioned adjacent the valve head and is slidably sealed in a bore 10A, 10B and a third piston head 11A, 11B works in a bore communicating with the inlet 1B, 1A, respectively.

Considering now just the control valve controlling communication between inlet 1A and outlet 3A, the piston head 7A has a full effective area A3, i.e. the cross-sectional area of the piston head 7A less the cross-sectional area of the adjacent stem, which is greater than the full effective area A1 of the second piston head 9A, in turn greater than the full effective area A2 of the third piston head 11A, the last mentioned being exposed to the pressure in inlet 1B, which, in normal operation, will be equal to the pressure in the inlet 1A.

When braking pressure is passed to the inlet 1A, the pressure P acts in the same sense on areas A3 and A2, against the spring 8A, and in the opposite sense on area A1. Thus, the hydraulic thrust is equal to $P(A3+A2-A1)$, and when this thrust is sufficient to overcome the pre-load in spring 8A, the valve plunger moves outwardly, to the left in FIG. 1, to close the valve head 5A against seat 4A and thereby close off communication between the inlet 1A and outlet 3A. The valve will remain closed until the pressure in the inlet 1A is reduced to, or is just below, the cut-off pressure at which it caused the valve to close.

It will be seen that, should the inlet pressure at the inlet 1B be removed, as by complete failure of the pressure source feeding that inlet, the hydraulic thrust tending to close the valve will be reduced to $P(A3-A1)$, thus increasing the pressure required at the inlet 1A to overcome the force of spring 8A and thereby close the valve.

Similarly, the cut-off pressure at inlet 1B is reduced in the event of loss of pressure in the inlet 1A.

When installed in a diagonally split dual pressure braking system, the inlet 1A is connected to a first pressure source supplying one front wheel brake, and the outlet 3A to the diagonally opposed rear wheel brake. Similarly, inlet 1B and outlet 3B are connected to a second pressure source and other front brake, and to the other rear wheel brake respectively. The effect of loss of pressure in one system is to raise the cut-off pressure of the control valve in the other system. In this way the braking efforts at the diagonally opposed front and rear brakes which are still operative tend to be equalised. It is, however, still desirable to arrange for the pressure transmitted to the operative rear brake to be limited, at high braking pressures, in order to reduce the risk of the rear wheel skidding.

Figure 2:
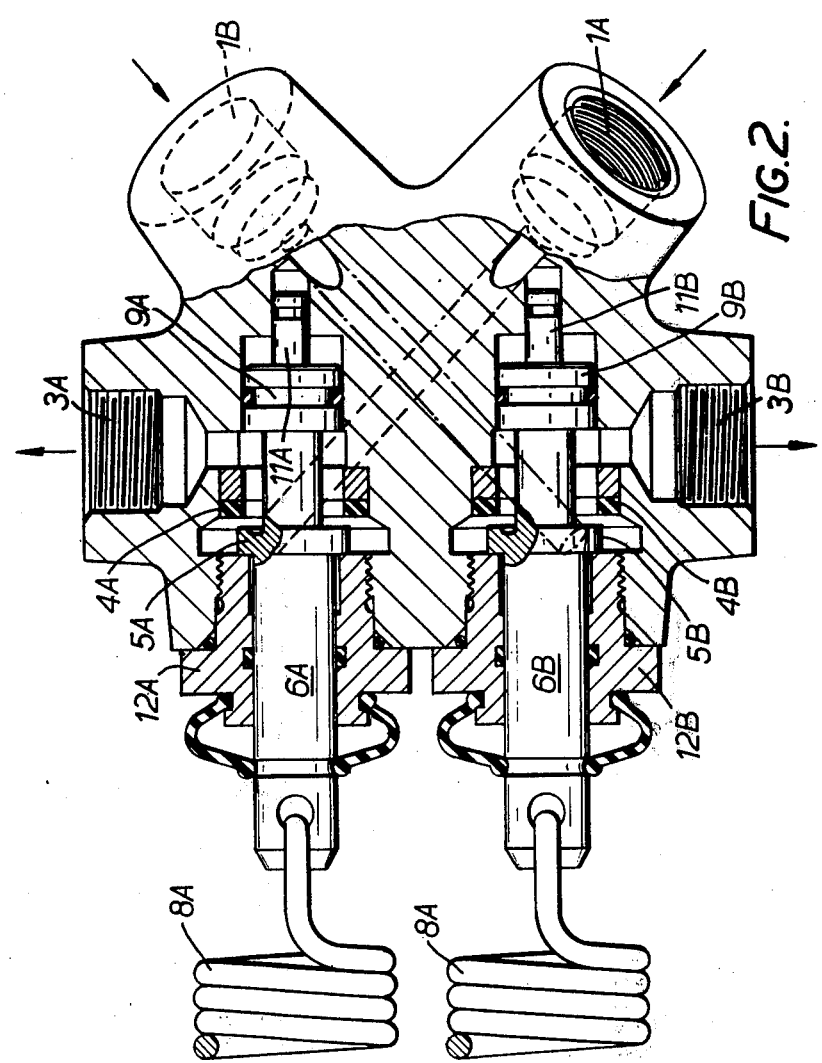
FIG. 2 is an axial cross-section of a second embodiment.

The valve assembly shown in FIG. 2 is generally similar in construction and operation to that of FIG. 1, and only the main points of difference call for separate description. In this case, the valve bores 2A, 2B are arranged side-by-side and are similarly oriented.

The stem of the plunger 6A or 6B of each control valve, instead of carrying a separate piston head (7A, 7B), extends in sliding sealed relation through an end closure plug 12A, 12B and has its outer end connected to a tension control spring 8A, 8B which, in use, is stressed in accordance with the loading of the vehicle and always acts in a sense to keep the valve open. Finally, the piston heads 9A, 9B and 11A, 11B are reversed in their effective operation, in that the pressure on piston head 9A or 9B tends to close the valve, and the pressure on piston head 11A or 11B tends to open it.

Let the cross-sectional area of each piston head 9A, 9B be A1 the cross-sectional area of each piston head 11A, 11B be A2 and the cross-sectional area of each stem 6A, 6B be A3. It will be seen that, when a pressure P is applied to inlets 1A and 1B, the hydraulic thrust tending to close the valve is equal to $P(A1-A3-A2)$ and the valve will close when this thrust reaches a sufficiently high value to overcome the opening force exerted by the external control spring.

However, if the inlet pressure, say in inlet 1B is removed, the closing thrust is increased to $P(A1-A3)$ so that the valve will close at a lower cut-off pressure P developed at inlet 1A.

Such a valve assembly is suitable for incorporation in a vehicle braking system of the so-called L-split type, in which one pressure source supplies front wheel brake cylinder working spaces on both front wheels and a rear wheel brake cylinder on one rear wheel, whilst a second pressure source is connected to separate brake cylinder working spaces on both front wheels and to a rear wheel brake cylinder on the other rear wheel.

In such a case, the inlets 1A, 1B are connected to the respective pressure sources and the outlets 3A, 3B to the respective rear wheel brake cylinders. In the event of failure of one pressure source, the valve assembly operates in the manner described above to reduce the cut-off pressure to which the remaining rear brake cylinder is limited, in order to limit the excess braking effort on one side of the vehicle relative to the other.

Many variations and modifications will, of course, be possible within the scope of the present invention. For example, the valves need not be pressure limiting valves but could be pressure reducing valves. Also, the valve assembly could be modified so that only one of the control valves is subject to pressure in the inlet of the other valve, in order to meet special installation requirements.

We claim:

1. A valve assembly for use in a vehicle braking system, having separate wheel brakes and separate pressure sources, comprising first and second valves having respective inlets for connection to said separate pressure sources and respective outlets for connection to said separate wheel brakes, wherein each valve includes a movable valve part carried by an associated pressure responsive member, a stationary valve part cooperating with the movable part to control communication between the inlet and outlet, said stationary valve part being stationary at all times, and biasing means applying a biasing force urging said pressure responsive member in a direction to maintain its valve open, and wherein each said pressure responsive member is stepped and has opposed piston of different dimensions, both being subjected to the pressure at the inlet of its associated valve to produce a net effect tending to close that said valve in opposition to said biasing means, and has a further stepped diameter portion directly subjected to the inlet pressure of the other said valve to produce an additional force on said pressure responsive member, said additional force acting independently of the biasing force of the biasing means of said other valve and said additional force being removed upon failure of the inlet pressure of said other valve.

2. A valve assembly according to claim 1, wherein said additional force on each pressure responsive member assists the action of the respective said biasing means.

3. A valve assembly according to claim 1, including a unitary housing, wherein said biasing means is in the form of a control spring located within said housing.

4. A valve assembly according to claim 1, wherein said pressure responsive members of said respective valves act in opposite directions to close said valves.

5. A valve assembly according to claim 1, including a unitary housing, wherein each pressure responsive member extends sealingly through said housing and is connected externally of said housing to the respective biasing means.

* * * * *